(12) United States Patent
Klatt

(10) Patent No.: US 6,705,175 B1
(45) Date of Patent: Mar. 16, 2004

(54) GEARSHIFT CONTROL DEVICE FOR A TRANSMISSION

(75) Inventor: Alfred Klatt, Wathlingen (DE)

(73) Assignee: WABCO GmbH & Co. oHG, Hannover (DE)

( * ) Notice: Subject to any disclaimer, the term of this patent is extended or adjusted under 35 U.S.C. 154(b) by 0 days.

(21) Appl. No.: 09/605,437

(22) Filed: Jun. 28, 2000

(30) Foreign Application Priority Data

Jul. 9, 1999 (DE) ......................................... 199 31 973

(51) Int. Cl.[7] ......................... F16H 59/00; F16H 61/00; F16H 63/00
(52) U.S. Cl. ....................................................... 74/335
(58) Field of Search .............................. 74/335, 473.11, 74/473.12, 473.13; 192/3.58, 3.3

(56) References Cited

U.S. PATENT DOCUMENTS 5,249,476 A * 10/1993 Zaiser et al. ................... 74/335
5,836,207 A * 11/1998 Spooner et al. ............... 74/335
6,116,391 A * 9/2000 Kremmling et al. ....... 192/3.58
6,223,617 B1 * 5/2001 Tischer et al. ............ 74/473.11

FOREIGN PATENT DOCUMENTS

DE 3315221 12/1982

* cited by examiner

*Primary Examiner*—Tisha D Lewis
(74) *Attorney, Agent, or Firm*—Proskauer Rose LLP

(57) ABSTRACT

A device for controlling a gearshift which has a first pressure medium chamber and a second pressure medium chamber which are separated from each other by a piston, includes a first valve system, a second valve system, and an upstream third valve system by which the two pressure chambers are selectively connectable to a pressure medium source or to a pressure medium sink or can be closed off against both as a function of the output signals of an electrical control system. A pressure sensing device is installed between the pressure medium inputs of the two valve systems and the pressure medium outlet of the third valve system by which the pressure in each one of the pressure medium chambers of the gearshift can be measured or by which the pressure of the pressure medium source, i.e. the supply pressure, can be monitored. The electrical control system is designed in such manner that the actuation of at least one of the valve systems can be rendered dependent on at least the signals of the pressure sensing device, so that the gearshifting force and also the gearshifting speed of the gearshift can be controlled as a function of pressure.

30 Claims, 4 Drawing Sheets

GEARSHIFT CONTROL DEVICE FOR A TRANSMISSION

BACKGROUND OF THE INVENTION

The present invention relates to a device for controlling a gearshift of a transmission, and more particularly, a gearshift control device for a transmission of the type which includes a gearshift having first and second pressure medium chambers which are separated from each other by a piston that can be moved in the direction of its longitudinal axis, first and second controllable valve systems via which the first and second pressure medium chambers can be respectively connected selectively to a pressure medium source or sink, and an electrical control system to actuate the valve systems.

A device of this type is disclosed, for example, in DE 33 15 221 C2. Such known device includes a first controllable valve system and a second controllable valve system, by means of which a first pressure medium chamber and a second pressure medium chamber of a gearshift can be selectively connected to a pressure medium source or to a pressure medium sink. The gearshift is provided with a piston and a piston rod, whereby the piston can be moved by the pressure medium in the pressure medium chambers in the direction of its longitudinal axis. The piston rod is connected via a lever to the selection shaft of a transmission. In addition, the device is provided with a pressure-medium actuated retaining device for the selection shaft of the transmission. The retainer device can be selectively connected to the pressure medium source or to the pressure medium sink by means of a controllable valve system. The controllable valve systems are connected to an electrical control system.

To shift the transmission, the retainer device is first brought into its disengaged position by subjecting it to the pressure medium. The piston of the gearshift, which is connected to the selection shaft, is then driven by introducing pressure medium into the first pressure medium chamber of the gearshift. Shortly before the selection shaft has reached the desired position, the retaining device is vented. The force of a spring of the retaining device causes part of the retaining device to go into a position in which the retaining device brakes the selection shaft. At the same time, the feeding of the pressure medium to the pressure medium chamber of the gearshift is stopped. When the selection shaft has reached the desired position, it is retained in this position by the retaining device. The shifting of the retaining device from the disengaged position to the braking or holding position, and the termination of the pressure medium feeding to the pressure medium chamber of the gearshift, take place as a function of the position or as a function of the running speed of the selection shaft of the transmission.

Among other things, the controlled retaining device in accordance with the known gearshift control device prevents the piston to move beyond the desired position in the course of a positioning process (overshooting of the piston). This overshooting of the piston is caused, in part, by the fact that the pressure in the pressure medium chamber of the gearshift rises relatively abruptly in the course of a positioning process, in order to be able to exert a force on the piston and thereby on the selection shaft sufficient to disengage the selection shaft from a fixed position. The steep rise in pressure in turn causes the piston to move at relatively high speed in the direction of its predetermined holding position.

It is the object of the invention to provide a device for the control of a gearshift of a transmission that can be fabricated simply and effectively.

SUMMARY OF THE INVENTION

In accordance with these and other objects of the invention, there is provided a gearshift control device for a transmission which includes a gearshift having a first pressure medium chamber and a second pressure medium chamber which are separated from each other by a piston movable in a direction of its longitudinal axis. A first controllable valve system is provided, via which the first pressure medium chamber is selectively connectable to a pressure medium source or to a pressure medium sink. The first controllable valve system includes a pressure medium input, a first pressure medium outlet connected to the first pressure medium chamber and a second pressure medium outlet. A second controllable valve system is also provided, via which the second pressure medium chamber is selectively connectable to the pressure medium source or to the pressure medium sink. The second controllable valve system includes a pressure medium input, a first pressure medium outlet connected to the second pressure medium chamber, and a second pressure medium outlet. The gearshift control device further includes an electrical control system for actuating the first and second controllable valve systems. A third controllable valve system is also provided, and which is controllable by operation of the electrical control system. The third valve system is connected to the first controllable valve system and to the second controllable valve system, as well as to the pressure medium source, in such manner that the pressure medium input of the first controllable valve system and the pressure medium input of the second controllable valve system can be selectively connected to the pressure medium source or can be closed off against said pressure medium source. The gearshift control device further includes a pressure sensing device for measuring a first pressure in the first pressure medium chamber and a second pressure in the second pressure medium chamber, the pressure sensing device being connected electrically to the electrical control system. The electrical control system is designed and linked to the pressure sensing device and the controllable valve systems in such manner that actuation of at least one of the controllable valve systems can be rendered dependent upon at least the signals of the pressure sensing device.

The invention provides the particular advantage that the actuating force of the gearshift can be controlled by simple means in a pressure-dependent manner. The device according to the invention is simple in structure and economical in its manufacture.

In a particularly advantageous further development of the device according to the invention, the pressure medium connection of a pressure sensing device, consisting of only one pressure sensor, is connected to a pressure medium pipe which connects the first controllable valve system and the pressure medium input of a second controllable valve system of the gearshift to the pressure medium outlet of a third controllable valve system, a pressure medium input of which is connected to a pressure medium source. Such configuration makes it is possible to measure the degree of pressure in either of the two pressure medium chambers using only one pressure sensor, as well as to monitor the level of the supply pressure for the gearshift.

In another advantageous further development of the invention, the pressure medium inputs of two additional valve systems assigned to the two pressure medium chambers of a second gearshift are connected to pressure medium pipes connecting the pressure medium outlet of the third valve system to the pressure medium inputs of the two valve systems of the first gearshift and of the pressure sensing device. By virtue of this further development of the invention, two gearshifts with only one additional valve system and only one pressure sensing device can be very easily controlled through pressure. The pressure in each pressure medium chamber of the two gearshifts and the supply pressure can be measured with only one pressure sensing device.

A choke is advantageously installed between the pressure medium outlet of the third controllable valve system and the pressure medium inputs of the two controllable valve systems of the gearshift. The choke prevents the pressure on the pressure sensing device to rise to the level of the supply pressure during the control phase. The pressure at the pressure sensing device is therefore closer to the pressure in a pressure medium chamber of the gearshift.

The gearshift is advantageously equipped with a distance sensor, so that the piston of the gearshift can be brought into any predetermined position as a function of the signals of the distance sensor.

The above, and other objects, features and advantages of the present invention will become apparent from the following description read in conjunction with the accompanying drawing.

DETAILED DESCRIPTION OF THE PREFERRED EMBODIMENT

Figure 1:
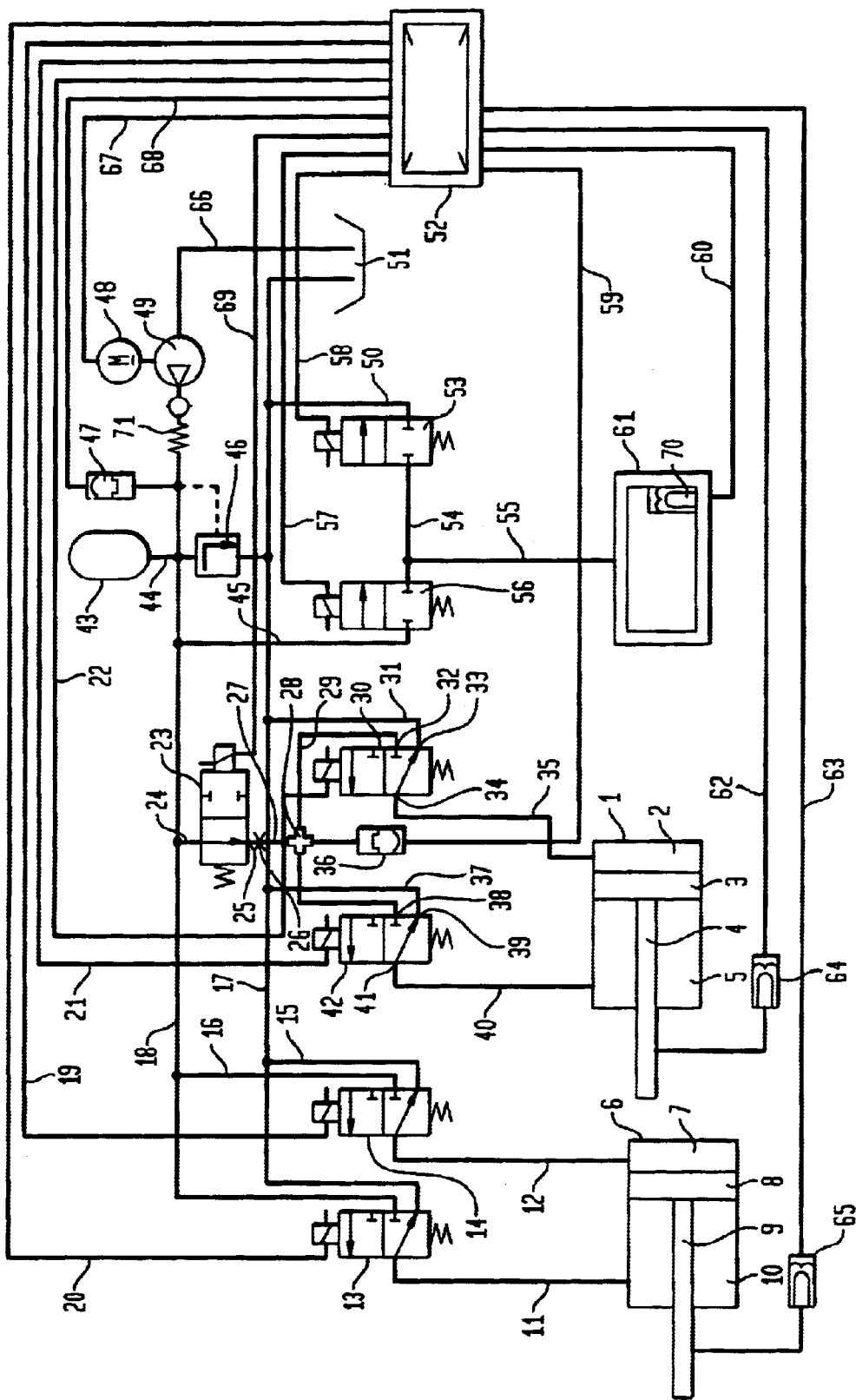
FIG. 1 is a simplified schematic representation of a system for the control of a transmission in accordance with an embodiment of the invention.

Referring to FIG. 1, the system depicted therein includes a first double-action ram cylinder and a second double-action, ram cylinder, wherein the first ram cylinder serves as a first gearshift 1 and the second ram cylinder as a second gearshift 6. The first gearshift 1 includes a first pressure medium chamber 2 and a second pressure medium chamber which are separated from one another by a piston 3, which is movable in the direction of its longitudinal axis. A sealing ring, which is not shown, and which presses sealingly against the wall of the gearshift, is provided on the circumference of the piston 3. A piston rod, which serves as a positioning element 4, centered on the piston 3. The second gearshift 6 includes a first pressure medium chamber 7 and a second pressure medium chamber 10 which are separated from one another by a piston 8 which is movable in the direction of its longitudinal axis. A sealing ring, which is not shown, is installed on the circumference of the piston 8 and presses sealingly against the internal wall of the gearshift 6. A piston rod, serving as a positioning element 9, is centered on the piston 8. The first gearshift 1 and the second gearshift 6 are actively connected to a selection finger or selection shaft of a transmission, neither of which is shown. The first gearshift 1 serves to displace the gears of the transmission on the transmission shaft and the second gearshift 6 serves to displace the selection finger or selection shaft in the selection gutter of the transmission.

The first pressure medium chamber 2 of the first gearshift 1 is connected via a pressure medium pipe 35 to a pressure medium outlet 34 of a first controllable valve system 30. The second pressure medium chamber 5 of the first gearshift 1 is connected via a pressure medium pipe 40 to a pressure medium outlet 41 of a second controllable valve system 42. A pressure medium pipe 29 connects a pressure medium input 32 of the first valve system 30 to a pressure medium input 38 of the second valve system 42. The pressure medium pipe 29 is connected via a branch element 28 and a pressure medium pipe 27 to a pressure medium outlet 25 of a third controllable valve system 23 serving as a check valve, and also to a pressure medium connection of a pressure sensing device 36 provided, for example, in the form of a pressure sensor. A choke 26 is installed in the pressure medium pipe 27, between the pressure medium outlet 25 of the third valve system 23 and the branch element 28. A pressure medium input 24 of the third valve system 23 is connected via a pressure medium pipe to a pressure medium pipe 18 serving as a supply conduit. The pressure medium pipe 18 is connected to the pressure medium outlet of a pressure medium pump 49, serving as a pressure-producing device, and via a pressure medium pipe 44 branching off from the pressure medium pipe 18, to a pressure medium storage 43. The pressure medium storage 43 is connected via the pressure medium pipe 44 to a pressure regulating valve 46. The pressure medium outlet of the pressure medium pump 49 is followed by a cut-off valve 71, which can be locked in the direction of the pressure medium pump 49. An input of the pressure medium pump 49 is connected via a fluid pipe 66 to a container 51, which serves as a pressure medium sink for a liquid medium, for example, hydraulic oil. A motor 48 is used to drive the pressure medium pump 49.

A pressure medium outlet 33 of the first valve system 30 is connected to the container 51 via a pressure medium pipe 31 and an additional pressure medium pipe 17 which is connected to the pressure medium pipe 31. In the same manner, a pressure medium outlet 39 of the second valve system 42 is connected to the container 51 via a pressure medium pipe 37 which is also connected to the pressure medium pipe 17. An additional pressure sensor 47 is connected to the pressure medium pipe 18, and is used to monitor the supply pressure.

In the depicted example, the first valve system 30 and the second valve system 42 are in the form of 3/2-way solenoid valves. The third valve system 23 is in the form of a 2/2-way solenoid valve. The solenoids of the three valve systems 30, 42, 23 are electrically connected via electrical lines 22, 21, 69 to the corresponding outputs of an electrical control system 52 which are assigned to them. The pressure sensing device 36 and the pressure sensor 47 are electrically connected via electrical lines 59, 68 to the inputs of the electrical control system 52 assigned to them.

A clutch cylinder 61, actuated by a pressure medium, serves to connect the input shaft of the transmission to the output shaft of an engine (not shown). The clutch cylinder 61 can be selectively connected to, or closed off from, the pressure medium source 43, 49 or the container 51 which serves as a pressure medium sink, via an inlet and outlet valve system 56, 53.

The inlet and outlet valve system 56, 53 is comprised of a first 2/2-way solenoid valve 56 and a second 2/2-way solenoid valve 53 which are connected, via electrical lines 57, 58, to the outputs of the electrical control system 52 which are assigned to them. The pressure medium input of the first 2/2-way solenoid valve 56 is connected to the pressure medium pipe 18 serving as a supply pipe via a pressure medium pipe 45. The pressure medium output of the solenoid valve 56 is connected to the pressure medium chamber of the clutch cylinder 61 via a pressure medium pipe 54, and via a pressure medium pipe 55 connected to the pressure medium pipe 54. The pressure medium pipes 54, 55 concomitantly serve to connect the pressure medium chamber of the clutch cylinder 61 to the pressure medium input of the second 2/2-way solenoid valve 53. The pressure medium outlet of the solenoid valve 53 is connected to the container 51 serving as a pressure medium sink via a pressure medium pipe 50, and via the pressure medium pipe 17 connected to the pressure medium pipe 50. A distance sensor 70 assigned to the clutch cylinder 61 to measure the actuator travel of the clutch is connected via an electrical line 60 to one input of the electrical control system 52.

A distance sensor 64 for recording the distance traveled by the positioning element 4 (measuring the actuator travel) is assigned to the piston 3 or to the positioning element 4. The distance sensor 64 is connected to the input of the electrical control system 52 via an electrical line 62. The motor 48, which drives the pressure medium pump 49, is connected to an output of the electrical control system 52 via an electrical line 67.

The first pressure medium chamber 7 of the above-mentioned second gearshift 6 is connected to the pressure medium outlet of a first controllable valve system 14 in the form of a 3/2-way solenoid valve via a pressure medium pipe 12. The pressure medium input of the first valve system 14 is connected via a pressure medium pipe 16 to the pressure medium pipe 18 which serves as supply pipe. The pressure medium outlet of the first valve system 14 is connected to the pressure medium pipe 17 going to the pressure medium sink via a pressure medium pipe 15. The second pressure medium chamber 10 of the second gearshift 6 is connected to the pressure medium outlet of a second controllable valve system 13 in the form of a 3/2-way solenoid valve via a pressure medium pipe 11. The pressure medium input of the second valve system 13 is connected to the pressure medium pipe 18 which serves as a supply pipe. The pressure medium outlet of the second valve system 13 is connected to the pressure medium sink 51 via the pressure medium pipe 17. The solenoids of the two solenoid valves 14, 13 are connected to their assigned outlets of the electrical control system 52 via electrical lines 19, 20. A distance sensor 65 for measuring the travel of the actuator, and which is assigned to the piston 8 or to the positioning element 9 of the second gearshift 6, is connected to the input of the electrical control system 52 via an electrical line 63.

The operation of the above-described device is described in further detail below.

For purposes of this description, it is to be assumed that the device serves to control a transmission located in a motor vehicle. In the depicted respective positions of the first valve system 30 and the second valve system 42 of the first gearshift 1, the pressure medium chambers 2, 5 of the first gearshift 1 are closed off from the pressure medium source 43, 49 constituted by the pressure medium pump 49 and the pressure medium storage 43, and are connected to the container 51 for hydraulic oil (pressure medium sink). The third valve system 23 serving as a shut-off valve, and which is installed upstream of the two valves systems 30, 42, is switched to a position allowing passage. The pressure sensing device 36, consisting of a single pressure sensor, is subjected to the pressure of the pressure medium source 43, 49 (supply pressure) appearing at the pressure medium inputs 32, 38 of the two controllable valve systems 30, 42, and transmits an electric signal corresponding to the pressure to the electrical control system 52. The two pressure medium chambers 7, 10 of the second gearshift 6 are similarly closed off against the pressure medium source 43, 40, and are connected to the container 51 by means of the controllable valve systems 14, 13 assigned to them. The clutch cylinder 61 is closed off against the pressure medium source 43, 49 and against the container 51 by means of the two controllable valve systems 56, 53 assigned thereto.

When a gear of the transmission is to be selected, an appropriate signal to that effect is transmitted by a gearshifting step selector to the electrical control system 52. The electrical control system 52 then electrically actuates the first valve system 56 assigned to the clutch cylinder 61 which is used as an inlet valve, the first valve system 14 assigned to the second gearshift 6 and the first valve system 30 assigned to the first gearshift 1, in preselected sequence. The first valve system 56 assigned to the clutch cylinder 61 and serving as an inlet valve is then moved into its open position. The clutch cylinder 61 is subjected to the pressure of the pressure medium, causing the clutch to be brought into its disengaged position.

The first valve system 14 of the second gearshift 6 is then switched over, such that the first pressure medium chamber 7 of the second gearshift 6 is closed off against the pressure medium sink and is connected to the pressure medium source 43, 49. The piston 8 of the second gearshift 6 serving as a gutter cylinder is driven by the pressure medium in the direction of the second pressure medium chamber 10. At the same time, the selection finger or selection shaft of the transmission which is connected to the piston 8 is displaced in the selection gutter by the positioning element 9 until it reaches a predetermined position. From the signal emitted by the distance sensor 65, the electrical control system 52 detects that the selection finger or selection shaft has reached the desired position. The control signal on the first valve system 14 of the second gearshift 6 then dissipates, causing the first valve system to close off the first pressure medium chamber 7 against the pressure medium source 43, 49 and to connect it to the pressure medium sink.

The first valve system 30 assigned to the first gearshift 1 is then switched over in such a manner that it closes off the first pressure medium chamber 2 of the first gearshift 1 against the pressure medium sink and connects the first pressure medium chamber 2 via the third valve system 23 to the pressure medium source 43, 49. The piston 3 of the first gearshift 1 serving as the gearshift selection cylinder is then driven by the pressure medium in the direction of the second pressure medium chamber 5. At the same time, the selection finger or selection shaft of the transmission which is connected via the positioning element 4 to the piston 3 is displaced so as to bring two gears into engagement with each other.

The pressure which is introduced into the first control chamber 2 of the first gearshift 1 is regulated according to a table which is stored in electronic circuitry installed in the electrical control system 52.

The pressure sensing device 36 continuously measures the pressure in the first pressure medium chamber 2 of the first gearshift 1 and supplies corresponding signals to the electrical control system 52. The pressure level in the first pressure medium chamber 2 represents the shifting force exerted upon the piston 8, and thereby on the transmission elements to be shifted. At the same time, signals which correspond to the distance traveled by the piston 3, and which are emitted by the distance sensor 64 assigned to the first gearshift 1, are transmitted to the electrical control system 52.

The electrical control system 52 is designed and equipped to evaluate the signals of the pressure sensing device 36 and the signals of the distance sensor 64, and transmit control signals to the third valve system 23 when the detected actual pressure value is equal to a target pressure value stored in a table or deviates from same, and/or when the detected actual distance value is equal to a target distance value stored in a table or deviates from same, depending on whether a difference or an equivalence between actual pressure value and target pressure value or between the actual distance value and the target distance value is to be used as a shifting criterion.

Because of the fact that a relatively great actuating force is to be exerted in the beginning phase of the gearshifting process and that the shifting process is then continued with an only slowly increasing actuating force, and to end with a more rapidly increasing actuating force, the electrical control system 52 transmits one of the above-mentioned signals, but at least a signal dependent upon the signals of the pressure sensing device 36, for example, an impulse-width modulated signal with varying sampling ratio, to the solenoids of the third valve system 23. As a result, the third valve system 23 is switched alternately into its closed position and into its open position, whereby the duration of the closed position and the duration of the open position of the third valve system 23 is shorter or longer, as a function of the signal of the electrical control system 52.

Consequently, the rise in pressure in the first pressure medium chamber 2 follows a characteristic curve which rises steeply at first, then rises less steeply or, if desired, becomes flat, and following this, again rises steeply. The positioning speed of the positioning element 4 is correspondingly rapid at first, decelerates thereafter and then accelerates once again.

The table, in accordance with which the pressure is introduced into the first pressure medium chamber 2, is formulated such that the control signal which serves to actuate the third valve system 23 is transmitted by the electrical control system 52 when the electronic system recognizes from the output signal emitted by the pressure sensing device 36 that the pressure in the pressure medium chamber 2 has reached a level after which, according to the table, the subsequent pressure rise should be less abrupt, and according to a characteristic curve suitable for producing an actuating force which no longer increases as rapidly, and/or when the electronic system receives a signal from the distance sensor 64 which is equal to a given distance value stored in the table. The control signal for the third valve system 23 is then modified by the electronic system such that the control signal pauses are short. The pressure rise in the first pressure medium chamber 2 then continues only in smaller pressure steps. As a result, the positioning speed of the positioning element 4 is reduced, and the actuating force acting upon the positioning element 4 only increases slowly.

If the electronic system, in further processing the table, recognizes from the signal of the distance sensor 64 of the first gearshift 1 that the positioning element 4, and therefore also the selection finger or the selection shaft of the transmission, has covered an additional distance indicated by the table, and that the actual pressure value transmitted by the pressure sensing device 36 is not equal to the new target pressure value stored in the table, the electronic system changes the control signal for the third valve system 23 in such manner that the control signal pauses are of relatively long duration. The rise in pressure in the first pressure medium chamber 2 then takes place in greater pressure steps. As a result, the positioning speed of the positioning element 4 increases, and the actuating force acting upon the positioning element 4 also increases again more rapidly.

The pressure in the first pressure medium chamber 2 is continuously monitored by the pressure sensing device 36 for conformity with the different levels predetermined by the table. The control signal for the third valve system 23 is corrected by the electronic system if the actual value of the pressure level in the first pressure medium chamber 2 deviates from the target value for the pressure level predetermined by the table.

When the piston 3, and thereby the positioning element 4, have covered a distance which is equal to the required shifting distance of the selection finger or the selection shaft of the transmission in order to select the desired gear, the signal of the distance sensor 64 corresponding to this distance causes the control signals at the first valve system 30 assigned to the first gearshift 1 and on the third valve system 23 to dissipate. The first valve system 30 of the first gearshift 1 and the third valve system 23 then return to their starting position in which the first pressure medium chamber 2 of the first gearshift 1 is again closed off from the pressure medium source 43, 49 and is connected to the pressure medium sink. The third valve system 23 then once again connects the inputs of the first valve system 30 and of the second valve system 42 to the pressure medium source 43, 49.

Upon completion of the gearshifting process, the electrical control system at the valve system 56 assigned to the clutch cylinder 61 and serving as an inlet valve also dissipates, and the valve system 53 serving as outlet valve of the clutch cylinder receives a control signal from the electrical control system 52. The outlet valve then goes into its open position and connects the pressure medium chamber of the clutch cylinder 61 to the pressure medium sink. The clutch then returns to its position connecting the engine to the transmission. The control signal at the valve system 53 serving as an outlet valve is then terminated in response to an output signal of the distance sensor 70 assigned to the clutch cylinder 61, so that the valve system 53 returns to its closed position.

If the transmission is to be switched to its idle position, the electrical control system 52 first actuates the valve system 56 assigned to the clutch cylinder 61 and serving as an inlet valve, and then the second valve system 42 assigned to the second pressure medium chamber 5 of the first gearshift 1. The clutch then reaches its disengagement position. The second valve system 42 is switched such that it closes off the second pressure medium chamber 5 from the pressure medium sink and connects the second pressure medium chamber 5 to the pressure medium source 43, 49 via the open third valve system 23. The pressure which then builds up in the second pressure medium chamber 5 drives the piston 3 in the direction of the first pressure medium chamber 2 of the first gearshift 1. The distance sensor 64 of the first gearshift 1 continuously measures the distance traveled by the piston 3 and transmits signals corresponding to that distance to the electrical control system 52. If the electrical control system 52 recognizes that the piston 3 has reached its neutral central position, the electrical control system 52 terminates the corresponding control signal transmitted to the second valve system 42. The second valve system 42 then returns to its starting position. The piston 3 then remains in its neutral central position. Due to the incompressibility of the hydraulic fluid, the position of the piston 3 then no longer changes.

Following this process, the control signal going to the valve system 56 which serves as the inlet valve of the clutch cylinder 61 is terminated. The valve system 56 then returns to its starting position. When an appropriate signal is transmitted by the electrical control system 52, the pressure medium chamber of the clutch cylinder 61 is connected to the pressure medium sink via the valve system 53 serving as outlet valve of the clutch cylinder 61. The clutch then moves to the position which connects the engine to the transmission.

The piston 3 can, however, also be stopped in its central position by actuating the third valve system 23, which then closes off the pressure medium input 38 of the second valve system 42 from the pressure medium source 43, 39.

The termination of the control signal at the second valve system 42 or the actuation of the third valve system 23 may take place when the piston 3 has reached its central position, or shortly before the piston 3 has reached its central position. If a liquid medium, such as hydraulic oil, is used as the pressure medium, the valve system 42 or 23 is switched over when the piston 3 has reached its central position. If a gaseous medium is used, which thereby renders a precise positioning of the piston more difficult due to its compressibility, the valve system 42 or 23 is switched over shortly before the piston 3 has reached its central position.

When a gear is selected which requires a gearshifting movement of the positioning element 4 of the first gearshift 1 in the direction of the first pressure medium chamber 2, the introduction of the pressure medium into the second pressure medium chamber 5 takes place in the same manner as in the gearshifting process described above, where the pressure medium is introduced into the first pressure medium chamber 2. Instead of the first valve system 30, it is, however, the second valve system 42 which is switched over in such manner that it closes off the second pressure medium chamber 5 from the pressure medium sink and connects it to the pressure medium source 43, 49.

Due to the fact that the third valve system 23 is located between the two valve systems 30, 42 assigned to the first gearshift 1 and the pressure medium source 43, 49, and that the actuation of the third valve system 23 is effected, at least in part, as a function of the signals of the pressure sensing device 36, the gearshifting force as well as the gearshifting speed and the gearshifting distance of the first gearshift 1 can be easily modified.

With regard to the pressure medium pump 49, which serves as a pressure producing device, or in the case of a compressor or a motor 48 driving the pressure producing device if the system is operated by compressed air, the electrical control system 52 is switched on at least in the control phases in which the third valve system 23 is in its open position, when the pressure in the pressure medium storage 43 or in the supply pipe has reached a lower pressure value or has dropped below it, and is switched off when the pressure in the pressure medium storage 43 or in the supply pipe has reached or exceeded an upper pressure value. The control signal is emitted as a function of the signals of the pressure sensor 47 connected to the supply pipe and constantly monitoring the supply pressure, or as a function of the signals of the pressure sensing device 36 downstream of the third valve system 23.

The pressure sensor 47 is, however, not needed if the pressure sensing device 36 assigned to the two valve systems 30, 42 of the first gearshift 1 is linked to the electrical control system 52 in such manner that its signals are also transmitted to an evaluating device of the electrical control system 52 which controls the motor 48 or controls the pressure producing device.

Installing the choke 26 between the pressure medium outlet 25 of the third valve system 23 and the pressure medium inputs 32, 38 of the first valve system 30, of the second valve system 42 and of the pressure sensing device 36, or by designing the third valve system in the form of a choke valve, ensures that brief pressure fluctuations occurring at the outlet of the third valve system 23 because of the high supply pressure have only insignificant or no effect on the momentary pressure in the pressure medium pipe 27 during a pressure regulating process. This prevents the pressure appearing in the control phase at the pressure sensing device 36 from rising to the pressure level of the supply pressure in the pressure medium pipe 18. The pressure appearing at the pressure sensing device 36 is therefore closer to the pressure in the pressure medium chamber 2 or 5 of the first gearshift 1.

According to the invention it is also possible to provide a pressure sensing system with a first pressure sensor and a second pressure sensor. The first pressure sensor is then connected directly to the first pressure medium chamber 2 and the second pressure sensor is then connected directly to the second pressure medium chamber S of the first gearshift 1. The two pressure sensors are connected electrically to the electrical control system 52. Actuating at least one of the controllable valve systems can then be rendered dependent upon at least the signals of the pressure sensor which monitors the pressure in the pressure medium chamber whose pressure is to be influenced. According to the invention, the third controllable valve device may also consist of a first controllable shut-off valve and a second controllable shut-off valve.

Figure 2:
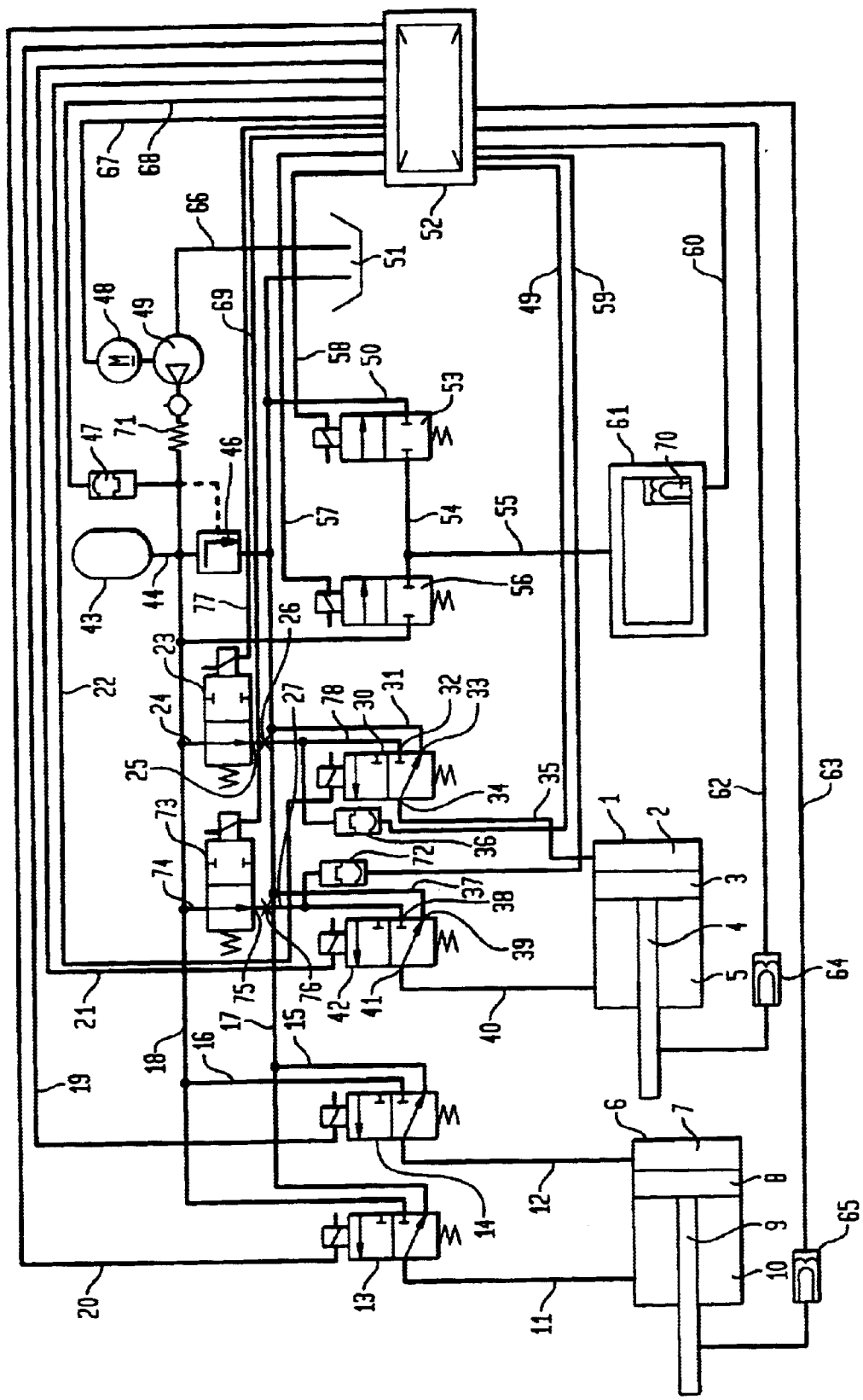
FIG. 2 is a modification of FIG. 1 to show the embodiment of a third controllable valve device comprising both first and second controllable shut-off valves.

This embodiment is shown in FIG. 2, where the first shut-off valve 23 is then located between the pressure medium input 32 of the first controllable valve system 30 and the pressure medium source 43, 49, while the second shut-off valve 73 is located between the pressure medium input 38 of the second controllable valve system 42 and the pressure medium source 43, 49. The two shut-off valves 23, 73 can be designed in the form of 2/2-way solenoid valves. In such an embodiment of the device according to the invention, the first pressure sensor 36 can be located between the pressure medium outlet 25 of the first shut-off valve 23 and the pressure medium input 32 of the first valve system 30, and the second pressure sensor 72 between the pressure medium outlet 75 of the second shut-off valve 73 and the pressure medium input 38 of the second valve system 42. In addition, the first choke 26 is positioned between output 25 of the first shut-off valve 23 and the input 32 of the first controllable device 30, while the second choke 76 is positioned between the output 75 of the second shut-off valve 73 and the input 38 of the second controllable valve device 42.

Figure 3:
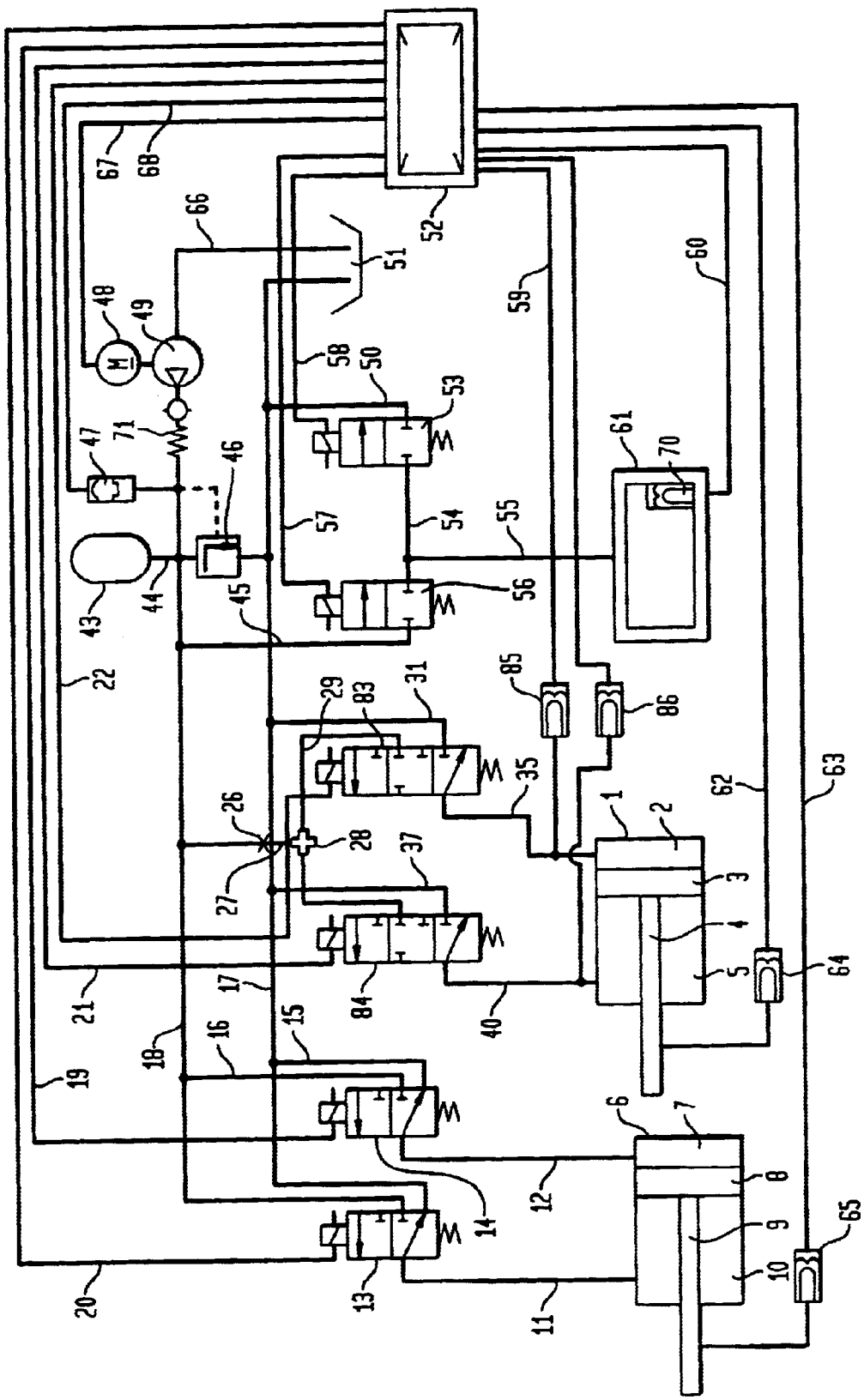
FIGS. 3 and 4 illustrate additional embodiments of the invention.

In another embodiment of the invention, as shown in FIG. 3, it is also possible for the first controlled valve system to be designed in such manner, for instance in the form of a solenoid-operated multi-way valve 83, and to be connected in such manner to the first pressure medium chamber 2 of the first gearshift 1 and to the pressure medium source 43, 49, that the first pressure medium chamber 2 can be selectively connected to the pressure medium source 43, 49 or to the pressure medium sink 51, or can be closed off against either by means of this valve system 83. In the same way, the second valve system can be designed in such manner, for example, in the form of a solenoid-operated multi-way valve 84, and can be connected in such manner to the second pressure medium chamber 5 of the first gearshift 1 and to the pressure medium source 43, 49, that the second pressure medium chamber 5 can be connected by means of the second valve system 84 selectively to the pressure medium source 43, 49 or to the pressure medium sink 51, or can be closed off against either. The valve systems of this design 83, 84 are then actuated by the electronics of the electrical control system 52 in the same manner as the third valve system 23, the first valve system 30 and the second valve system 42 in the embodiment shown in FIG. 1. A third valve system, such as the one provided in the previously described embodiment between the pressure medium source 43, 49 and the valve systems assigned to the pressure medium chambers 2, 5 of the first gearshift 1, is not required with this embodiment of the invention.

With this type of embodiment of the device according to the invention, the first pressure sensor 85 is directly connected to the first pressure medium chamber 2, and the second pressure sensor 86 is connected directly to the second pressure medium chamber 5 of the first gearshift 1.

With this type of embodiment of the device according to the invention, the first pressure sensor is directly connected to the first pressure medium chamber 2, and the second pressure sensor is connected directly to the second pressure medium chamber 5 of the first gearshift 1.

According to the invention, the electrical control system 52 may also be designed so that it actuates the first valve system, the second valve system or the third valve system in such manner that when pressure is supplied to the one pressure medium chamber 2 or 5 or when the pressure medium supply to this pressure medium chamber 2 or 5 is interrupted, the pressure drop in the other pressure medium chamber 5 or 2 is also interrupted. This measure safely prevents against a movement of the piston beyond the desired position. Such a pressure control assumes, however, that the first valve system and the second valve system are designed so that they are able to selectively connect the pressure medium chambers assigned to them to the pressure medium source or to the pressure medium sink, or can close them off from both, or that the third valve system is constituted by two shut-off valves.

According to the invention, it is also possible to design the electrical control system 52 such that both pressure medium chambers 2, 5 of the first gearshift 1 are subjected to a pressure medium during a gearshifting process, and such that a movement of the positioning element 4 which is connected to the piston 3 is achieved through a controllable drop of pressure in one of the two pressure medium chambers 2, 5. The configuration and the placement of the valve systems 30, 42, 23 and the pressure sensing device consisting of two pressure sensors remains unchanged. The difference between the pressure in the one pressure chamber 2 or 5 and the pressure in the other pressure chamber 5 or 2 of the first gearshift 1 is determined by the electrical control device during a gearshifting process. If a differential pressure value is detected which is equal to a differential pressure value stored in a table, the electrical control system 52 transmits a corresponding control signal to the third valve system 23 and to the valve system 30 or 42 by means of which the pressure drop in one of the two pressure medium chambers 2 or 5 is to be controlled. The other pressure medium chamber of the two is simultaneously closed off from the pressure medium source 43, 49. A large difference between the pressure in one pressure medium chamber and the pressure in the other pressure medium chamber affects the forces which are exerted upon the piston 3, and thereby on the positioning element 4, in exactly the same manner as the pressure medium introduction into one of the pressure medium chambers with a steeply rising pressure. A small difference between the pressures in the two pressure medium chambers of the gearshift affects the force that acts upon the piston and the positioning element in exactly the same manner as the pressure medium introduction into one of the pressure medium chambers at a less steeply rising pressure. The effects on the gearshifting speed are also the same.

According to the invention, it is also possible to provide a third valve system between the two controllable valve systems 14, 13 assigned to the second gearshift 6 and the pressure medium source 43, 49, and to provide a pressure sensor in the pressure medium pipe going from the pressure medium outlet of this third valve system to the pressure medium inputs of these two valve systems 14, 13. The pressure in the pressure medium chambers 7, 10 of the second gearshift 6 can then be regulated in the same manner as the pressure in the pressure medium chambers 3, 5 of the first gearshift 1 on the basis of a table stored in the electronic system of the electrical control system 52. The controllable valve systems of the second gearshift 6 can then also be of the same design as the controllable valve systems of the first gearshift 1.

In the same manner, two pressure sensors can also be provided, with each of the two pressure sensors being assigned to one of the pressure medium chambers 7 or 10 of the second gearshift 6.

According to the invention, the pressure medium input of the first valve system 14 and the pressure medium input of the second valve system 13 of the second gearshift 6 can also be connected directly to the pressure medium pipe 27 which is connected to the pressure medium pipe 29 connecting the pressure medium input 32 of the first controllable valve system 30 and the pressure medium input 38 of the second controllable valve system 42 of the first gearshift 1 to one another, and to the pressure medium connection of the first pressure medium chamber 2. Such a linking of the pressure medium pipes of the device according to the invention is possible because the first gearshift 1 and the second gearshift 6 are each switched at different points in time, and not simultaneously. The force acting upon the piston 8, and thereby upon the positioning element 9 of the second gearshift 6, can thus be modified very easily by controlling the third valve system 23.

The electrical control system 52 in such an embodiment of the invention is designed in such manner, and linked in such manner to the two controllable valve systems 30,42 of the first gearshift 1, to the two controllable valve systems 14, 13 of the second gearshift 6 and to the third controllable valve system 23, as well as to the pressure sensing device 36, that the actuation of at least one of these valve systems 14, 13, 23 can be rendered dependent on the signals of the pressure sensing device 36. Depending on the switched position of the valve systems 30, 42, 14, 13, 23, the pressure sensing device 36 can be subjected to the pressure of the first pressure medium chamber 2 or the pressure of the second pressure medium chamber 5 of the first gearshift 1, or with the pressure of the first pressure medium chamber 7 or the pressure of the second pressure medium chamber 10 of the second gearshift 6, or with the pressure of the pressure medium source 43, 49.

The electric signals emitted by the pressure sensing device 36, and which represent the detected pressures, are transmitted to the electrical control system 52. The electrical control system 52 is equipped to evaluate the signals of the pressure sensing device 36 and transmit control signals to at least one of the controllable valve systems 30, 42, 14, 13, 23 when the detected actual pressure value are equal to certain target pressure values stored in a table, or when they deviate from it, depending on whether a difference or an equivalency between the actual pressure value and the target pressure value is to be used as a switching criterion.

In addition, the control signals can then be rendered dependent on signals which are transmitted by the distance sensors 64, 65 to the electrical control system 52. The electrical control system 52 is equipped to evaluate the distance sensor signals and transmit control signals to at least one of the controllable valve systems 30, 42, 14, 13, 23 when the detected actual distance values are equal to certain target distance values stored in a table, or when they deviate from it, depending on whether a difference or an equivalency between the actual distance value and the target distance value is to be used as a switching criterion.

The electrical control system 52 is further equipped to recognize whether a detected actual pressure value is equal to a certain target pressure value, and if, in addition, a detected actual distance value is equal to a certain target distance value, and to transmit control signals to at least one of the valve systems 30, 42, 14, 13, 23, but preferably to the third valve system 23 when this condition is met, or cause the control signal or signals to fade away at the at least one valve system 30,42,14,13,23.

Figure 4:
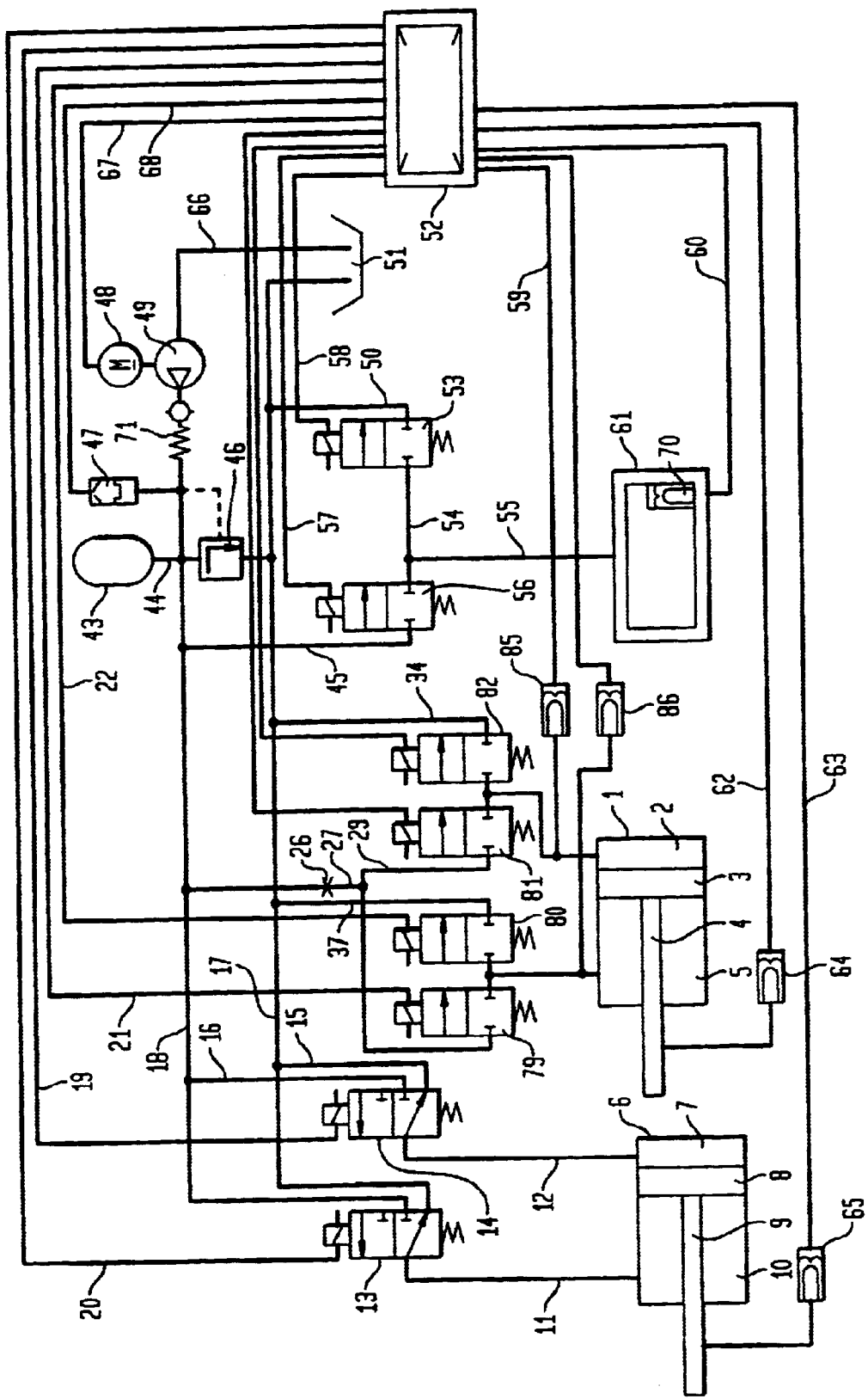

According to the invention, as shown in FIG. 4, a first controllable valve system assigned to the first pressure medium chamber 2 of the gearshift 1 can be provided in the form of a controllable 2/2-way valve 81, serving as an inlet valve, and a 2/2-way valve 82, serving as an outlet valve. The second controllable valve system assigned to the second pressure medium chamber 5 of the first gearshift 1 is also constituted by a controllable 2/2-way valve 79, serving as an inlet valve, and a 2/2-way valve 80, serving as an outlet valve. In this arrangement, the pressure sensing device 36 of FIG. 1 is replaced by a first pressure sensor 85 connected to the first pressure medium chamber 2 and a second pressure sensor 86 connected to the second pressure medium chamber 5. The two pressure sensors 85, 86 and the four 2/2-way valves 79, 80, 81, 82, in the form of solenoid valves, are connected electrically to the electrical control system 52. By controlling the 2/2-way valves 79, 80, 81, 82 accordingly, each of the two pressure medium chambers 2, 5 can be selectively connected to the pressure medium source 43,49, or to the pressure sink 51, or they can be closed off from both.

The electrical control system 52 is then designed and connected to the two pressure sensors and the four 2/2-way valves in such manner that actuation of the 2/2-way valves serving as inlet valves and, if applicable, also the actuation of the 2/2-way valves, serving as outlet valves, can be rendered dependent on at least the signals of the pressure sensing device.

For purposes herein, the statement that the actuation of at least one of the valve systems 30, 42, 14, 13, 23 can be rendered dependent on at least the signals of the pressure sensing device 36 is understood to mean that at least one of several actuations of at least one of the valve systems 30 or 42 or 23 is caused by a signal which depends on a signal of the pressure sensing device 36 representing a certain pressure level in the pressure medium chamber. Further actuations of the same valve system, or of another one of the valve systems 30 or 42 or 23 can, however, also be rendered dependent on other signals, for example, dependent on signals of the distance sensor 64, for the same pressure control process.

A pressure control process is to be understood to be the pressure introduction or also the pressure reduction which is required for a complete gearshifting process of the gearshift.

A gaseous or a liquid medium can serve as the pressure medium to drive the piston of the gearshift.

The gearshift can be designed in the form of a double-action work cylinder or in form of a three-position cylinder.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A gearshift control device for a transmission, comprising:
   a gearshift including a first pressure medium chamber and a second pressure medium chamber which are separated from each other by a piston movable in a direction of a longitudinal axis thereof;
   a first controllable valve device via which the first pressure medium chamber is selectively connectable to a pressure medium source or to a pressure medium sink, the first controllable valve device including a pressure medium input, a first pressure medium outlet connected to the first pressure medium chamber and a second pressure medium outlet;
   a second controllable valve device via which the second pressure medium chamber is selectively connectable to the pressure medium source or to the pressure medium sink, the second controllable valve device including a pressure medium input, a first pressure medium outlet connected to the second pressure medium chamber, and a second pressure medium outlet;
   an electrical control system for actuating the first and second controllable valve devices;
   a third controllable valve device controllable by operation of the electrical control system, said third valve device being connected to the first controllable valve device and to the second controllable valve device, as well as to the pressure medium source, in such manner that the pressure medium input of the first controllable valve device and the pressure medium input of the second controllable valve device can be selectively connected to the pressure medium source or can be closed off against said pressure medium source;
   wherein the first, second and third controllable valve devices are configured to enable each of the first and second pressure medium chambers to be closed off separately and simultaneously against the pressure medium source and against the pressure medium sink;
   a pressure sensing device for measuring a first pressure in the first pressure medium chamber and a second pressure in the second pressure medium chamber, the pressure sensing device being connected electrically to the electrical control system, and the pressure sensing device measuring each of the first and second pressures independently from each other;
   the electrical control system being designed and linked to the pressure sensing device and the controllable valve devices in such manner that actuation of at least one of the controllable valve devices can be rendered dependent upon at least the signals of the pressure sensing device;
   the third controllable valve device includes a pressure medium outlet and a pressure medium input connected to the pressure medium source and a pressure medium pipe;

the pressure medium input of the first controllable valve device and the pressure medium input of the second controllable valve device are connected to each other via a pressure medium pipe and to the pressure medium outlet of the third controllable valve device;

the pressure sensing device includes a pressure medium connection which is connected to the pressure medium pipe which connects the pressure medium input of the first controllable valve device and the pressure medium input of the second controllable valve device to each other and to the pressure medium outlet of the third controllable valve device;

the pressure medium input of the first controllable valve device, the pressure medium input of the second controllable valve device and the pressure medium connection of the pressure sensing device can be connected via the third controllable valve device selectively to the pressure medium source or can be closed off from said pressure medium source; and the pressure sensing device being comprised of a pressure sensor which can be subjected to the pressure of the first pressure medium chamber, to the pressure of the second pressure medium chamber of the gearshift, or to the pressure of the pressure medium source, as a function of a switching position of the first, second and third controllable valve devices, said pressure sensor producing electrical signals representing the pressure in the first pressure medium chamber, the pressure in the second pressure medium chamber, or the pressure in the pressure medium source.

2. A device according to claim 1, wherein:

the third controllable valve device is comprised of a first controllable shut-off valve and a second controllable shut-off valve, and the first controllable shut-off valve is located between the pressure medium input of the first controllable valve device and the pressure medium source, and the second shut-off valve is located between the pressure medium input of the second controllable valve device and the pressure medium source.

3. A device according to claim 1, wherein the first controllable valve device and the second controllable valve device are provided in the form of 3/2-way solenoid valves.

4. A device according to claim 1, wherein the third controllable valve device is provided in the form of a 2/2-way solenoid valve.

5. A device according to claim 2, wherein the first controllable shut-off valve and the second controllable shut-off valve are provided in the form of 2/2-way solenoid valves.

6. A device according to claim 1, wherein the electrical control system is operable to actuate at least one of the valve devices when pressure is introduced into a pressure medium chamber of the gearshift, such that the pressure in the pressure medium chamber rises at first relatively steeply, then less steeply or flat, and then again rises steeply.

7. A device according to claim 1, wherein:

the pressure sensing device includes a first pressure sensor and a second pressure sensor;

the first pressure sensor can be subjected to the pressure of the first pressure medium chamber of the gearshift and the second pressure sensor can be subjected to the pressure of the second pressure medium chamber;

the first and second pressure sensors are electrically connected to the electrical control system; and the electrical control system is designed and linked to the first and second pressure sensors and the controllable valve devices in such manner that the actuation of at least one of the controllable valve devices can be rendered dependent of at least the signals of the pressure sensor which monitors the pressure in the pressure medium chamber whose pressure is to be influenced.

8. A device according to claim 1, wherein:

the electrical control system is operable such that before the beginning or at the beginning of a gearshift process, the valve devices are in a switching position in which both pressure medium chambers of the gearshift are connected to the pressure medium source, and such that in order to actuate the gearshift, at least one of the valve devices is actuated by the electrical control system in such manner that the pressure in one of the pressure medium chambers is decreased; and the electrical control system is further operable such that said electrical control system produces a control signal to actuate at least one of the controllable valve devices which causes a decrease in pressure such that a pressure difference between pressures in the first and second pressure medium chambers increases at first rapidly, then at slower rate, and then rapidly again.

9. A device according to claim 1, wherein the electrical control system is operable to produce a pulse-wide modulated signal with varying sampling control.

10. A device according to claim 1, wherein:

a distance sensor for detecting the distance traveled by the piston, the distance sensor being electrically connected to the electrical control system; and the electrical control system is designed and connected to the distance sensor in such manner that the actuation of at least one of the controllable valve devices can further be rendered dependent upon the signals of the distance sensor.

11. A device according to claim 1 further comprising a choke installed in the pressure medium pipe going from the pressure medium outlet of the third controllable valve device to the pressure medium input of the first controllable valve device and to the pressure medium input of the second controllable valve device, as well as to the pressure medium connection of the pressure sensing device.

12. A device according to claim 1, wherein the third controllable valve device is provided in the form of a choke valve, said choke valve being designed such that in a closed position thereof, said choke valve leaves a small passage cross-section open for the pressure medium and opens a large passage cross-section for the pressure medium in an open position thereof.

13. A device according to claim 1, further comprising:

supply pressure sensor for monitoring a supply pressure produced by said pressure medium source;

the pressure medium source including a pressure generating device; and the electrical control system being designed and linked to the pressure generating device and to the pressure sensing device or the supply pressure sensor such that the pressure generating device is switched on as a function of the signals of the pressure sensing device or of the supply pressure sensor at least in the control phases in which the third valve device is in its open position when the pressure reaches a predetermined lower pressure value of the supply pressure or drops below that pressure value, and is switched off when a predetermined upper pressure value of the supply pressure is reached or exceeded.

14. A device according to claim 13, further comprising:
a motor for driving the pressure generating device, the motor being connected to the electrical control system; and
the electrical control system being designed and linked to the motor and to the pressure sensing device or the supply pressure sensor in such manner that the motor is switched on as a function of the pressure sensing device or of the supply pressure sensor, at least in the control phases in which the third valve device is in its open position, when the pressure reaches a predetermined lower pressure value of the supply pressure or drops below it, and is switched off when a predetermined upper pressure value of the supply pressure is reached or exceeded.

15. A device according to claim 1, further comprising:
an additional gearshift including a first pressure medium chamber and a second pressure medium chamber separated from each other by a piston which can be moved in the direction of a longitudinal axis thereof;
a first additional controllable valve device including a pressure medium input, a first pressure medium outlet connected to the first pressure medium chamber of the additional gearshift, and a second pressure medium outlet;
a second additional controllable valve device including a pressure medium input, a first pressure medium outlet connected to the second pressure medium chamber of the additional gearshift, and a second pressure medium outlet;
the pressure medium input of the first controllable valve device of the additional gearshift and the pressure medium input of the second controllable valve device of the additional gearshift being connected to the pressure medium pipe which connects the pressure medium outlet of the third controllable valve device to the pressure medium input of the first controllable valve device and to the pressure medium input of the second controllable valve device of the gearshift, as well as to the pressure medium connection of the pressure sensing device;
the electrical control system being designed and linked to the first additional controllable valve device and to the second additional controllable valve device of the additional gearshift, as well as to the third controllable valve device and to the pressure sensing device, in such manner that the actuation of at least one of the controllable valve devices can be rendered dependent upon at least the signals of the pressure sensing device.

16. A device according to claim 15 wherein:
the electrical control system is designed and linked to the first and second controllable valve devices of the gearshift, to the first and second additional controllable valve devices of the additional gearshift, to the pressure sensing device and to the third controllable valve device in such manner that the pressure sensing device can be subjected to the pressure of the first pressure medium chamber or to the pressure of the second pressure medium chamber of the gearshift or to the pressure of the first pressure medium chamber or to the pressure of the second pressure medium chamber of the additional gearshift or to the pressure of the pressure medium source as a function of a switching position of the controllable valve devices and the additional controllable valve devices; and
the electrical control system produces signals corresponding to the pressure in the first pressure medium chamber or to the pressure in the second pressure medium chamber of the gearshift or to the pressure in the first pressure medium chamber or to the pressure in the second pressure medium chamber of the additional gearshift or to the pressure of the pressure medium source.

17. A gearshift control device for a transmission, comprising:
a gearshift including a first pressure medium chamber and a second pressure medium chamber which are separated from each other by a piston movable in a direction of a longitudinal axis thereof;
a first controllable valve device via which the first pressure medium chamber is selectively connectable to a pressure medium source or to a pressure medium sink, the first controllable valve device including a pressure medium input, a first pressure medium outlet connected to the first pressure medium chamber and a second pressure medium outlet;
a second controllable valve device via which the second pressure medium chamber is selectively, connectable to the pressure medium source or to the pressure medium sink, the second controllable valve device including a pressure medium input, a first pressure medium outlet connected to the second pressure medium chamber, and a second pressure medium outlet;
an electrical control system for actuating the first and second controllable valve devices;
a third controllable valve device controllable by operation of the electrical control system, said third valve device being connected to the first controllable valve device and to the second controllable valve device, as well as to the pressure medium source, in such manner that the pressure medium input of the first controllable valve device and the pressure medium input of the second controllable valve device can be selectively connected to the pressure medium source or can be closed off against said pressure medium source;
wherein the first, second and third controllable valve devices are configured to enable each of the first and second pressure medium chambers to be closed off separately and simultaneously against the pressure medium source and against the pressure medium sink;
a pressure sensing device for measuring a first pressure in the first pressure medium chamber and a second pressure in the second pressure medium chamber, the pressure sensing device being connected electrically to the electrical control system and the pressure sensing device measuring each of the first and second pressures independently from each other;
the electrical control system being designed and linked to the pressure sensing device and the controllable valve devices in such manner that actuation of at least one of the controllable valve devices can be rendered dependent upon at least the signals of the pressure sensing device;
the third controllable valve device is comprised of a first controllable shut-off valve and a second controllable shut-off valve; and
the first controllable shut-off valve is located between the pressure medium input of the first controllable valve device and the pressure medium source, and the second shut-off valve is located between the pressure medium input of the second controllable valve device and the pressure medium source.

18. A gearshift control device for a transmission, comprising:
- a gearshift including a first pressure medium chamber and a second pressure medium chamber which are separated from each other by a piston movable in a direction of a longitudinal axis thereof,
- a controllable valve device configuration via which the first and second pressure medium chambers are each selectively connectable to a pressure medium source or to a pressure medium sink;
- an electrical control system for actuating the controllable valve device configuration;
- wherein the controllable valve device configuration enables each of the first and second pressure medium chambers to be closed off separately and simultaneously against the pressure medium source and against the pressure medium sink;
- a pressure sensing device for measuring a first pressure in the first pressure medium chamber and a second pressure in the second pressure medium chamber, the pressure sensing device being connected electrically to the electrical control system, and the pressure sensing device measuring each of the first and second pressures independently from each other;
- the pressure sensing device includes a first pressure sensor and a second pressure sensor;
- the first pressure sensor can be subjected to the pressure of the first pressure medium chamber of the gearshift and the second pressure sensor can be subjected to the pressure of the second pressure medium chamber;
- the first and second pressure sensors are electrically connected to the electrical control system, and
- the electrical control system is designed and linked to the first and second pressure sensors and the controllable valve devices in such manner that the actuation of at least one of the controllable valve devices can be rendered dependent of at least the signals of the pressure sensor which monitors the pressure in the pressure medium chamber whose pressure is to be influenced.

19. A gearshift control device for a transmission according to claim 18, wherein said controllable valve configuration comprises:
- a first controllable valve device via which the first pressure medium chamber is selectively connectable to a pressure medium source or to a pressure medium sink, the first controllable valve device being operable to close off the first pressure medium chamber from the pressure medium source and from the pressure medium sink;
- a second controllable valve device via which the second pressure medium chamber is selectively connectable to the pressure medium source or to the pressure medium sink the second controllable valve device being operable to close off the second pressure medium chamber from the pressure medium source and from the pressure medium sink;
- wherein the first and second controllable valve devices are configured to enable each of the first and second pressure medium chambers to be closed off separately and simultaneously against the pressure medium source and against the pressure medium sink.

20. A device according to claim 19, wherein the electrical control system is operable to actuate at least one of the valve systems when pressure is introduced into a pressure medium chamber of the gearshift, such that the pressure in the pressure medium chamber rises at first relatively steeply, then less steeply or flat, and then again rises steeply.

21. A device according to claim 19, wherein:
- the pressure sensing device includes a first pressure sensor and a second pressure sensor;
- the first pressure sensor can be subjected to the pressure of the first pressure medium chamber of the gearshift and the second pressure sensor can be subjected to the pressure of the second pressure medium chamber;
- the first and second pressure sensors are electrically connected to the electrical control system; and
- the electrical control system is designed and linked to the first and second pressure sensors and the controllable valve devices in such manner that the actuation of at least one of the controllable valve devices can be rendered dependent of at least the signals of the pressure sensor which monitors the pressure in the pressure medium chamber whose pressure is to be influenced.

22. A device according to claim 19, wherein;
- the electrical control system is operable such that before the beginning or at the beginning of a gearshifting process, the valve systems are in a switching position in which both pressure medium chambers of the gearshift are connected to the pressure medium source, and such that in order to actuate the gearshift, at least one of the valve devices is actuated by the electrical control system in such manner that the pressure in one of the pressure medium chambers is decreased; and
- the electrical control system is further operable such that said electrical control system produces a control signal to actuate at least one of the controllable valve devices which causes a decrease in pressure such that a pressure difference between pressures in the first and second pressure medium chambers increases at first rapidly, then at a slower rate, and then rapidly again.

23. A device according to claim 19, wherein the electrical control system is operable to produce a pulse-wide modulated signal with varying sampling for control.

24. A device according to claim 19, wherein:
- a distance sensor for detecting the distance traveled by the piston, the distance sensor being electrically connected to the electrical control system; and
- the electrical control system is designed and connected to the distance sensor in such manner that the actuation of at least one of the controllable valve systems can further be rendered dependent upon the signals of the distance sensor.

25. A gearshift control device for a transmission according to claim 18, wherein said controllable valve device comprises
- a first controllable valve device via which the first pressure medium chamber is selectively connectable to a pressure medium source or to a pressure medium sink, the first controllable valve device being comprised of a controllable 2/2-way valve serving as an inlet valve via which the first pressure medium chamber can be selectively connected to the pressure medium source or can be closed off from it, and of a controllable 2/2-way valve serving as an outlet valve via which the first pressure medium chamber can be selectively connected to the pressure medium sink or can be closed off from said pressure medium sink;
- a second controllable valve device is provided via which the second pressure medium chamber can be selectively connected to the pressure medium source or to the pressure medium sink, the second controllable valve device being comprised of a 2/2-way valve serving as an inlet valve via which the second pressure medium chamber can be selectively connected to the pressure medium source or can be closed off from it, and of a controllable 2/2-way valve serving as an outlet valve via which the second pressure medium chamber can be selectively connected to the pressure medium sink or can be closed off against said pressure medium sink;

wherein the first and second controllable valve devices are configured to enable each of the first and second pressure medium chambers to be closed off separately and simultaneously against the pressure medium source and against the pressure medium sink; and further comprising an electrical control system for actuation of the first and second controllable valve devices;

the electrical control system being designed and linked to the pressure sensing device and the controllable 2/2-way valves in such manner that the actuation of at least one of the controllable 2/2-way valves can be rendered dependent upon at least the signals of the pressure sensing device.

26. A device according to claim 25, wherein the electrical control system is operable to actuate at least one of the valve devices when pressure is introduced into a pressure medium chamber of the gearshift, such that the pressure in the pressure medium chamber rises at first relatively steeply, then less steeply or flat, and then again rises steeply.

27. A device according to claim 25, wherein:

the pressure sensing device includes a first pressure sensor and a second pressure sensor;

the first pressure sensor can be subjected to the pressure of the first pressure medium chamber of the gearshift and the second pressure sensor can be subjected to the pressure of the second pressure medium chamber;

the first and second pressure sensors are electrically connected to the electrical control system; and the electrical control system is designed and linked to the first and second pressure sensors and the controllable valve devices in such manner that the actuation of at least one of the controllable valve devices can be rendered dependent of at least the signals of the pressure sensor which monitors the pressure in the pressure medium chamber whose pressure is to be influenced.

28. A device according to claim 25, wherein:

the electrical control system is operable such that before the beginning or at the beginning of a gearshifting process, the valve devices are in a switching position in which both pressure medium chambers of the gearshift are connected to the pressure medium source, and such that in order to actuate the gearshift, at least one of the valve devices is actuated by the electrical control system in such manner that the pressure in one of the pressure medium chambers is decreased; and the electrical control system is further operable such that said electrical control system produces a control signal to actuate at least one of the controllable valve devices which causes a decrease in pressure such that a pressure difference between pressures in the first and second pressure medium chambers increases at first rapidly, then at a slower rate, and then rapidly again.

29. A device according to claim 25 wherein the electrical control system is operable to produce a pulse-wide modulated signal with varying sampling for control.

30. A device according to claim 25, wherein:

a distance sensor for detecting the distance traveled by the piston, the distance sensor being electrically connected to the electrical control system; and the electrical control system is designed and connected to the distance sensor in such manner that the actuation of at least one of the controllable valve devices can further be rendered dependent upon the signals of the distance sensor.

* * * * *